United States Patent [19]

Johnson

[11] Patent Number: 4,750,438
[45] Date of Patent: Jun. 14, 1988

[54] METHOD OF APPLYING PARTLY GERMINATED SEEDS

[76] Inventor: Milton O. Johnson, 828 College Pkwy., Rockville, Md. 20850

[21] Appl. No.: 878,251

[22] Filed: Jun. 25, 1986

[51] Int. Cl.[4] .............................................. A01C 1/00
[52] U.S. Cl. ......................................... 111/1; 111/10; 47/DIG. 9
[58] Field of Search ................. 47/9, 16, 61, DIG. 9, 47/57.6; 111/1, 10, 6, 7, 11

[56] References Cited

U.S. PATENT DOCUMENTS

| | | | |
|---|---|---|---|
| 2,006,436 | 7/1935 | Sparks | 47/58 |
| 2,040,161 | 5/1936 | Widmann | 47/61 |
| 2,818,682 | 1/1958 | Finn | 47/9 X |
| 2,878,617 | 3/1959 | Finn | 47/9 X |
| 3,091,436 | 5/1963 | Finn | 47/9 X |
| 3,125,294 | 3/1964 | Lill | 47/9 X |
| 3,299,567 | 1/1967 | Perkins | 47/9 |
| 3,648,631 | 3/1972 | Fiedler et al. | 111/1 X |
| 3,900,963 | 8/1975 | Tukacs | 47/9 X |
| 3,950,892 | 4/1976 | Simkin | 47/DIG. 9 X |
| 3,991,514 | 11/1976 | Finck | 47/61 |
| 4,067,140 | 1/1978 | Thomas | 47/9 |
| 4,232,481 | 11/1980 | Chamoulaud | 111/1 X |
| 4,272,276 | 6/1981 | Szejtli et al. | 47/57.6 X |
| 4,315,380 | 2/1982 | Davidson | 47/DIG. 9 X |
| 4,658,539 | 4/1987 | Sluis | 47/57.6 |

FOREIGN PATENT DOCUMENTS

| | | | |
|---|---|---|---|
| 126428 | 7/1985 | Japan | 111/1 |
| 538675 | 5/1974 | U.S.S.R. | |
| 657781 | 11/1974 | U.S.S.R. | |
| 906416 | 2/1982 | U.S.S.R. | 111/6 |

OTHER PUBLICATIONS

Biologisches Centralblatt, vol. XXXV, No. 4, Apr. 20, 1915, pp. 161–176.
Sports Illustrated, May 17, 1982, pp. 42–45, 48, 49.

Primary Examiner—James R. Feyrer
Assistant Examiner—Danton D. DeMille
Attorney, Agent, or Firm—Hall, Myers & Rose

[57] ABSTRACT

This invention relates to a method of pregerminating and planting grass seed. The seeds are first soaked in water to expedite the water uptake and germination of the grass seed. The seeds are then drained and spread over an extended area for a period of time. A hydroseeder is then used to broadcast the pregerminated seeds over the ground.

18 Claims, 2 Drawing Sheets

METHOD OF APPLYING PARTLY GERMINATED SEEDS

BACKGROUND OF THE INVENTION

This invention relates to a method of planting partially germinated seeds on a commercial scale, and particularly doing so with grass seed to quickly provide a good looking lawn of grass, for example to thus provide a good lawn within two weeks, from the date of planting.

There have been prior attempts to grow plants from partly germinated seeds but nothing has been developed to permit use of partly germinated seeds for lawns, and other similar applications, on a commercial scale.

Due to the fragile nature of partly germinated seeds there are major problems to providing and planting partly germinated seeds on a commercial scale. Moreover, spontaneous combustion may destroy partly germinated seeds handled in bulk form.

SUMMARY OF THE INVENTION

The invention is useful for various seeds but for the disclosure of this application the procedure for applying the following particular grass seeds will be set forth:
   (a) Ryegrass—hybrid variety
   (b) Tall Fescue—hybrid variety
   (c) Finleaf Fescue—Creeping Red
   (d) Kentucky Bluegrass—Common The first step in the process is to soak the seeds in water. This may be done in a barrel which has a screen at the bottom to retain the seeds in the barrel when the barrel is drained by opening a valve to allow water to escape an opening in the bottom thereof. The barrel with the valve closed so that the bottom of the barrel is water tight may be filled up to two-thirds of the top with seed and then water added to within two inches of the top. The contents are then stirred until there are no pockets or clumps of dry seed in the barrel.

The soaking time for seeds in the barrel is twenty-four hours for Ryegrass, Tall Fescue, and Finleaf Fescue and forty-eight hours for Kentucky Bluegrass.

The temperature of the water, during soaking and germination, as well as the temperature of the surrounding air, should be at least 50° F. and is preferably held between 75° F. and 85° F.

The next step may be referred to as the seed germination step. The said valve is opened so that water is drained from the barrel. The seeds are next spread onto trays. The trays should allow air circulation above and below them and may be stacked in horizontal planes, one above the other, with about four inches of vertical spacing between trays.

The seed depth on each tray may be three inches for Ryegrass and Tall Fescue, two inches for Finleaf Fescue and one inch for Kentucky Bluegrass. Just enough water to keep the seeds damp for the duration of the germination period on the tray is employed; such water being applied as a fine mist.

The germination step (at 80° F.) continues for Ryegrass, for one and one-half days, for Tall Fescue two days, for Finleaf Fescue two and one-half days, and Kentucky Bluegrass five days; except that the germination step should be terminated earlier than the stated time periods if the seeds begin to sprout. Thus, generally, the seeds should remain on the trays, for the germination step, for at least about one day and usually one and one-half to five days. The germination step varies inversly with temperature; the higher the temperature the shorter the germination step.

The seeds are now ready to plant, and may be planted in accordance with the instructions hereafter given if the planting process proceeds immediately, that is preferably the same day. However, in commercial operations it is usually not practical to plant the seeds immediately at the conclusion of the germination step. In those cases in which immediate planting is not desirable, the germinated seeds may be subjected to a refrigeration step to preserve them until they are planted.

The refrigeration step may proceed as follows. As soon as possible after the germination step and preferably no later than twelve hours, the processed (partly germinated) seeds, while still on the trays, are inserted in a refrigerator with a temperature of about 35° F. until the seeds reach the temperature of the refrigerator. The seeds may be kept in the refrigerator for weeks or months, if kept damp throughout the time that they are refrigerated. Before the seeds are planted they may be placed in bags. The size of the bags for the seeds is not critical and may be the same size as those usually provided for commercial grass seed. The bags may be stored in the refrigerator at about 35° F. until planted, but preferably no longer than a few days or at most one week. If the bags hold the seeds for more than one week spontaneous combustion may overheat the seeds and kill them. If it is desirable to wait over a week before the seeds are planted following the germination step, the best way of doing this is to retain the seeds on the trays in the refrigerator at about 35° F. for a period up to within a week of planting and then bag the seeds.

The partly germinated seeds may be stored on trays, or in bags, at temperatures below freezing (32°F.) for prolonged periods, especially if the temperature is so low as to avoid all spontaneous combustion.

The planting step may proceed as follows. After the seeds are removed from the refrigerator they should preferably be kept cool until planted. If the seeds cannot be planted within twelve hours after removal from the refrigerator they should be returned to the refrigerator. The processed seed in the bags is much more tender than ordinary dry seed and caution must be exercised when applying the seed to the ground to avoid bruising the seed.

To plant seed for 900 square yards of lawn, a 1000 gallon hydro seeder may be used. The partly germinated seeds, water and wood fiber mulch are mixed according to the following instructions:

1. Have agitator of the hydro seeder turning.

2. Fill the tank with water to one-third full, and then slowly add more water, while 200 pounds of wood fiber mulch is also added, until the tank is about two-thirds full. Then the seeds that have been through the soaking and germination steps (and the refrigeration step if such is employed) are mixed, in the tank, with the water and the mulch that are already in the tank. Other forms of mulches may be used.

3. Continue filling tank to full.

4. Immediately begin seeding operation with a hydro seeder.

5. Seeding—use a 1½" hose and a nozzle large enough as not to constrict the flow of seed to the point that it may bruise the seed.

6. Start the pump of a hydro seeder and apply the mix evenly over the 900 square yards. Keep the pump pressure of the hydro seeder only high enough to properly apply the mix; if pressure is too high, the partly germinated seed can be bruised.

After the seeds have been thus planted they may then be covered with "additional mulch." To provide the additional mulch for 900 square yards of lawn, mix in the hydro seeder, 360 to 444 pounds of wood fiber mulch with sufficient water to fill the 1000 gallon tank, and then spread the resulting mixture over the 900 square yards of seeded area.

If fertilizer is to be applied with the hydro seeder it must be used in the additional mulch and preferably not mixed with the partly germinated seed.

After the lawn has been seeded, and "additional mulch" (if any) applied, the seed should be kept damp for three days, with the soil remaining moist to a depth of four inches. Soil and weather conditions will govern the amount of irrigation required. After the three days the lawn can be maintained the same as any other seeded or sodded lawn.

DETAILED DESCRIPTION OF THE INVENTION

In carrying out my invention, I preferably process seeds in bulk form of 50 pounds or more, usually, however, hundreds of pounds at a time, in a batch process.

Figure 1:
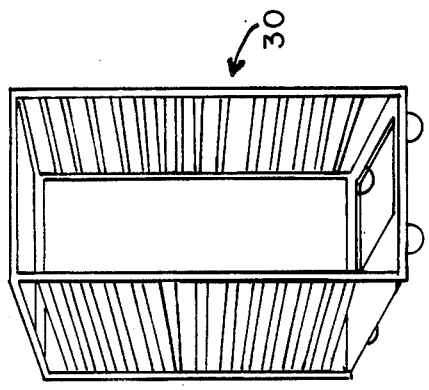
FIG. 1 shows a barrel and screen for soaking the seeds.
Figure 2:
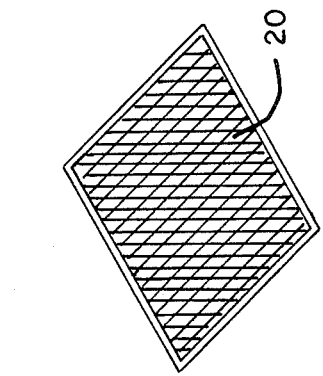
FIG. 2 shows a typical tray on which seeds are stored.
Figure 3:
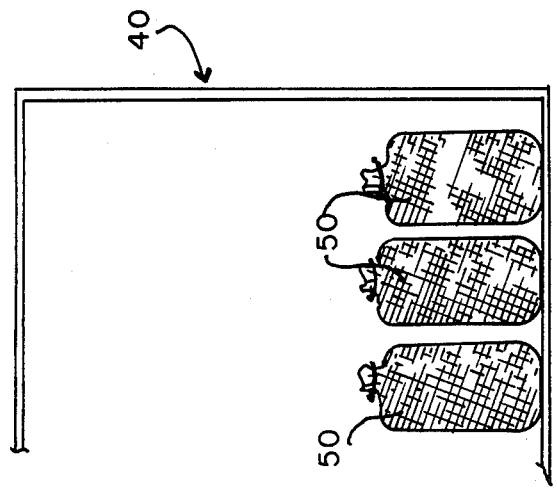
FIG. 3 shows a typical rack for storing the trays of FIG. 2.
Figure 4:
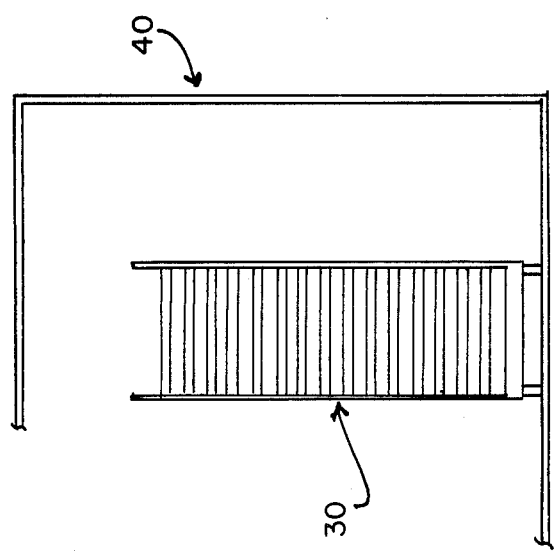
FIG. 4 shows a cut-away of a refrigerator with bags of partly germinated seeds therein.
Figure 5:
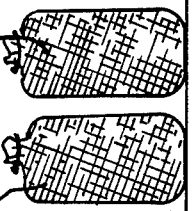

The first step in the process is to soak the seeds (50 pounds or more) in water. This may be done in a barrel 10 having a wall 11 and a screen 12 at the bottom to retain the seeds in the barrel when the barrel is drained by opening a valve 14 allowing water to escape through a pipe 13 connected to the bottom thereof. The barrel 10 with the valve 14 closed so that the bottom thereof is water tight may be filled up to two-thirds of the top with seed 15. The seeds in the barrel are therefore packed together with about the same density as seeds that are packed and sold in bags. The water is added to within two inches of the top. The water level 16 is shown in FIG. 1. The contents of the barrel are then stirred until there are no pockets or clumps of dry seed in the barrel.

The soaking time for the seeds in the barrel 10 is twenty-four hours for Ryegrass, Tall Fescue, and Fineleaf Fescue and forty-eight hours for Kentucky Bluegrass.

The temperature of the water, during the soaking and germination steps, as well as the temperature of the surrounding air, should be above 50° F. and is preferably held between 75° F. and 85° F.

The next step may be referred to as the seed germination step. First, the valve 14 is opened so that water is drained from the barrel 10. The seeds are collected on screen 12 and next spread onto trays 20 where they are piled to a depth many times the thickness of a seed. The trays 20 consist of fine mesh screen wire held at its edges by a frame and should allow air circulation through, above and below them. The trays 20 may be stacked, in horizontal planes, one above the other, with about a four inch vertical spacing between trays.

In the preferred form of the invention the trays 20 are mesh screens having overall dimensions of 30×36 inches. The rack 30 may handle up to 14 trays if the trays are spaced 4 inches apart.

The seed depth on each tray may be three inches for Ryegrass and Tall Fescue, two inches for Fineleaf Fescue and one-half inch for Kentucky Bluegrass. Just enough water to keep the seeds damp is employed; such water being applied as a fine mist from time to time as needed to keep the seeds damp. The seed depth on the trays depends on the size of the seed; the bigger the seed the thicker the permissible depth of seeds on the tray. If the depth of the seeds on the tray is excessive the seeds may be injured by spontaneous combustion.

The trays are preferably of screen wire so that there may be drainage of excess water.

The germination step (at 80° F.) continues, for Ryegrass, for one and one-half days, for Tall Fescue two days, for Fineleaf Fescue, two and one-half days and Kentucky Bluegrass five days; except that the germination step should be terminated earlier than the above-stated time periods if the seeds begin to sprout.

Irrespective whether or not the seeds have sprouted, they are now in an advanced stage of germination.

The seeds are now ready to plant, and may be planted in accordance with the instructions hereafter given if the planting process proceeds immediately, that is preferably the same day. However, in commercial operations it is usually not practical to plant the seeds immediately at the conclusion of the germination step. In those cases in which immediate planting is not desirable, the partly germinated seeds may be subjected to the refrigeration step to preserve them until they are planted.

The refrigeration step may proceed as follows. As soon as possible after the germination step and preferably no later than twelve hours, the processed (germinated) seeds, while still on the trays 20, in the rack 30, are inserted in a refrigerator 40 with a temperature of about 35° F. (but not greater than about 40° F.) until the seeds reach the temperature of the refrigerator. The seeds may be kept in the refrigerator for weeks or months, if kept damp throughout the time that they are refrigerated. Before the seeds are planted they may be placed in bags 50. The size of the bags for the seeds is not critical and may be the same size as those usually provided for commercial grass seed. The bags may be stored in the refrigerator at about 35° F. (but not above 40° F.) until planted, but preferably no longer than a few days or at most one week. If the bags hold the seeds for more than one week spontaneous combustion may overheat the seeds and kill them. If it is desirable to wait more than a few days before the seeds are planted, following the germination step, the preferred way of doing this is to retain the seeds on the trays 20 in the refrigerator 40 at about 35° F. for a period up to within a few days of planting and then bag the seeds.

The partly germinated seeds may be alternatively stored on trays, or in bags, at temperatures below freezing (32° F.) for prolonged periods, especially if the temperature is so low as to avoid all spontaneous combustion.

The planting step may proceed as follows. After the seeds are removed from the refrigerator they should preferably be kept cool until planted. If the seeds cannot be planted within twelve hours after removal from the refrigerator 40 they should be returned to the refrigerator 40 and put on trays 20. The processed seed in the bags is much more tender than ordinary dry seed and caution must be exercised when applying the seed to the ground to avoid bruising the seed.

Figures 6, 7:
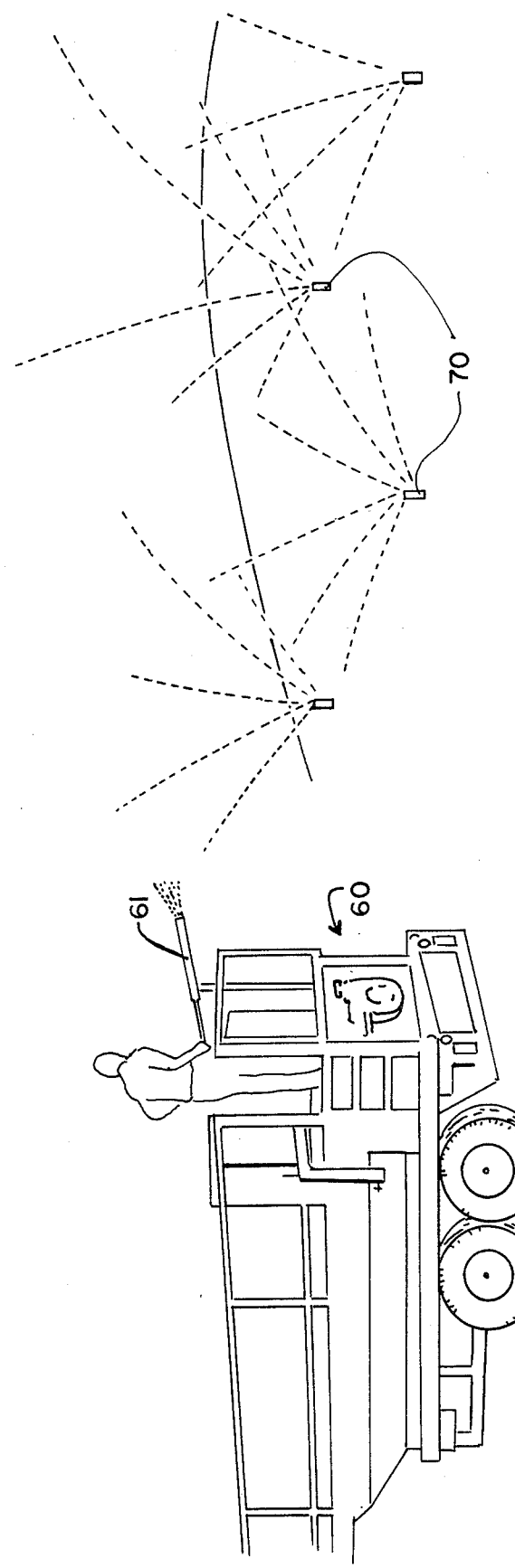
FIG. 6 shows a typical hydro seeding machine planting the partly germinated seeds.
FIG. 7 shows the watering step for a lawn which has been seeded with the partly germinated seeds.

To plant seed for 900 square yards of lawn, a 1000 gallon hydro seeder 60 with a nozzle 61 may be used. The hydro seeder may be of the type disclosed in U.S. Pat. No. 3,091,436 to Finn, issued May 28, 1963 entitled: Method for Producing a Sprayable Fiber Mulch. This patent is incorporated by reference as the apparatus of FIG. 6. The germinated seeds, water, and wood fiber mulch are mixed according to the following instructions (to cover 900 square yards):

1. Have agitator of the hydro seeder 60 turning.
2. Fill the tank with water to one-third full, and then slowly add more water, while 200 pounds of wood fiber mulch is also added, until the tank is about two-thirds full. Then the seeds that have been through the soaking and germination steps (and the refrigeration step if such is employed) are mixed, in the tank, with the water and the mulch that are already in the tank.
3. Continue filling tank of hydro seeder 60 to full.
4. Immediately begin seeding operation with hydro seeder 60.
5. Seeding—use a 1½" hose and a nozzle 61 large enough as not to constrict the flow of seed from hydro seeder 60 to the point that it may bruise the seed.
6. Start the pump of the hydro seeder 60 and apply the mix evenly over the 900 square yards. Keep the pump pressure only high enough to properly apply the mix, if pressure is too high, the partly germinated seed can be bruised.

Instead of hydro seeder 60, any other machine for planting grass seed, that will not bruise germinated seeds may be used.

The seeds thus planted may be covered with "additional mulch." To provide the "additional mulch" for 900 square yards of lawn, mix, in the hydro seeder 60, 360 to 444 pounds of wood fiber mulch with sufficient water to fill the 1000 gallon tank, and then spread the resulting mixture over the 900 square yards of seed.

If fertilizer is to be applied with the hydro seeder 60, it must be used with the "additional mulch" and not preferably mixed with partly germinated seed.

After the lawn has been seeded, and mulch (if any) applied, the seed should preferably be kept damp for three days, with the soil remaining moist to a depth of four inches. Soil and weather conditions will govern the amount of irrigation required. After three days the lawn can be maintained the same as any other seeded or sodded lawn.

The planted seeds can be kept moist, as stated above, by employing spot spinners 70 (throughout the lawn) to spray a fine mist over the lawn. Fan jets may be used for corners and other places not reached by the water from the spot spinners. The water should be limited so that it does not disturb or move the partly germinated seeds but should, however, keep the ground moist to a depth of about four inches.

The term "partly germinated" as used herein is to be construed broadly to include all grass seeds that have advanced toward germination at least as far as completion of the above-mentioned soaking step, or equivalent advancement toward germination in some other way. The term is also broad enough to include seeds that not only have sprouted but have a small leaf.

I claim to have invention:

1. The method of pregerminating and planting grass seeds, to provide a lawn, comprising:
    (a) soaking said grass seeds in water at a temperature above 50° F. to expedite the water upstate and germination of the grass seeds and then removing the water,
    (b) spreading the damp grass seeds over an extended area and having a depth of the spread seeds sufficiently small to allow the seeds to be exposed to ambient air so that the seeds will partly germinate, and maintaining the seeds in the damp condition at a temperature sufficient for germination for at least one day,
    (c) providing a hydro-seeder with a nozzle, and
    (d) mixing in said hydro-seeder the pregerminated seeds that have completed steps (a) and (b), with water, and squirting the resulting mixture from said nozzle onto the soil.

2. The method of claim 1 in which the seeds are stored in a temperature not in excess of 40° F. during at least part of the time that elapses between steps (b) and (c).

3. The method of claim 1 in which mulch is included in the mixture that is applied to the soil by the hydro seeder.

4. The method of claim 1 which includes allowing circulation of air past the seeds during step (b).

5. The method of pregerminating and planting grass seeds, comprising:
    (a) providing grass seed,
    (b) soaking said grass seed in water at a temperature above 50° F. for at least one day, and removing the water leaving the seeds damp,
    (c) spreading said dsmp grass seeds over an extended area with the seeds in at least one pile that is many seeds deep but not so deep as to cause injury to the seeds,
    (d) said grass seeds remaining in said damp spread condition at a temperature sufficient for germination for a period of time of sufficient length to provide further germination of the seeds and
    (e) providing a hydro-seeder having a nozzle and using the hydro-seeder to plant the seeds that have completed step (d) by applying them from said nozzle to the soil to thus plant the grass seeds and provide a lawn.

6. The method of claim 5 which includes allowing circulation of air past the seeds during step (c).

7. The method of applying grass seeds that are in an advanced stage of germination to the soil with a hydro-seeder that squirts the seeds from a nozzle under pressure, in order to quickly provide a lawn:
    providing at least 50 pounds of grass seed,
    soaking said grass seeds, in water, at a temperature above 50° F.,
    removing the water from the seeds, leaving them damp, spreading the damp grass seeds over an extended area and piling them on said area with the seed depth being sufficiently limited to avoid injury to the seeds, said grass seeds remaining damp while in such spread condition, and at a temperature above 50° F. for an extended period,
    the combined period of time that includes both said soaking step and said extended period comprising at least two days to thereby bring said seeds to an advanced stage of germination, and mixing said seeds that are in an advanced stage of germination with water and squirting the mixture from said nozzle over the ground to thus plant the grass seeds to quickly provide a lawn.

8. The method as defined in claim 1 in which said soaking step extends for at least one day.

9. The method defined in claim 1 in which said extended period is at least one day.

10. The method of claim 1 including providing at least one screen means, said spreading step comprising placing the soaked grass seeds on the screen means.

11. The method of claim 1 in which said seeds are refrigerated at a temperature not to exceed 40° F. following said germination process and prior to said planting step.

12. The method of claim 11 in which said seeds remain in said spread condition during at least a part of said refrigeration step.

13. The method of claim 11 in which seeds are stored in bags during at least a part of said refrigeration step.

14. The method of claim 11 in which said refrigeration step takes place at above 32° F.

15. The method of claim 11 in which said refrigeration step takes place below 32° F.

16. The method of claim 1 which includes adding mulch to the soil after the seed has been applied to the soil.

17. The method of claim 1 in which the soaking step and the spread condition each extend for at least about one day, and in which said seeds remain damp while in said spread condition, and refrigerating the seeds to hold them below 40° F. after they have partly germinated.

18. The method of claim 1 which includes allowing circulation of air past the seeds while the seeds remain damp in said spread condition.

* * * * *